(No Model.)

J. ESTES.
POTATO DIGGER.

No. 297,361. Patented Apr. 22, 1884.

WITNESSES
Theo. Mungen.
John T. Morrow

INVENTOR
Job Estes
By Anderson & Smith
his Attorneys

N. PETERS. Photo-Lithographer. Washington. D. C.

United States Patent Office.

JOB ESTES, OF STERLING, MICHIGAN.

POTATO-DIGGER.

SPECIFICATION forming part of Letters Patent No. 297,361, dated April 22, 1884.

Application filed October 20, 1883. (No model.)

*To all whom it may concern:*

Be it known that I, JOB ESTES, a citizen of the United States, residing at Sterling, in the county of Bay and State of Michigan, have invented certain new and useful Improvements in Potato-Diggers; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
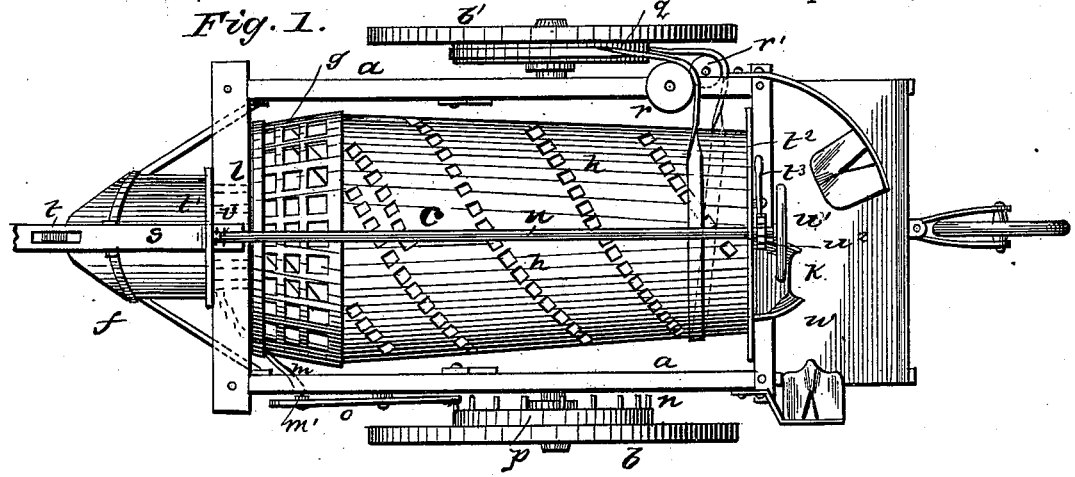
Figure 2:
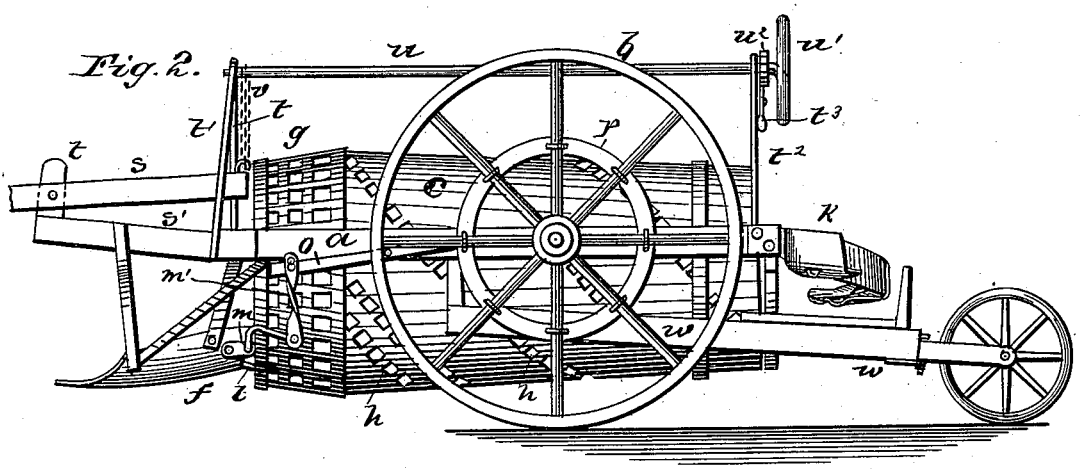
Figure 3:
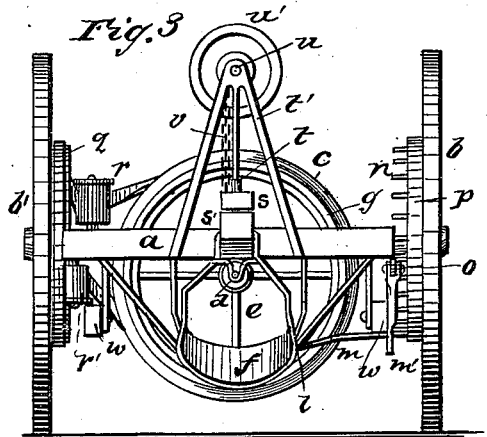
Figure 4:
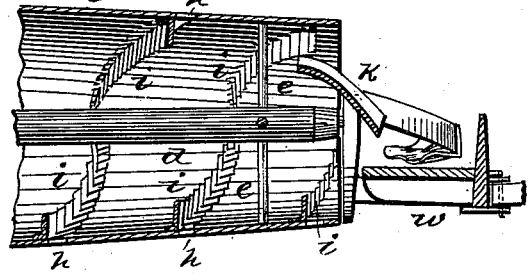

Figure 1 of the drawings is a representation of a plan view. Fig. 2 is a side elevation. Fig. 3 is a front elevation, and Fig. 4 is a sectional detail view.

This invention has relation to potato-diggers; and it consists in the construction and novel arrangement of devices, as will be hereinafter fully described, and particularly pointed out in the claims appended.

Referring by letter to the accompanying drawings, $a$ designates the main frame, mounted on the two wheels $b\ b'$, either one of which may be the driving-wheel.

$c$ designates a drum, which is mounted on a drum-shaft, $d$, connected thereto by radial arms $e$ near each of its ends, said shaft having its bearings in the front and rear timbers of the main frame. The drum $c$ tapers at its forward end, so that it will revolve readily without engaging the furrow opened by the plow or scoop $f$, secured to the frame and tongue in front of the drum. The tapering portion $g$ of the drum consists of open-work formed by arms intersecting each other at right angles. The remainder of the periphery of the drum is perforated spirally with rectangular openings $h$. Internal spiral flanges, $i$, are secured to the drum immediately in front of the spiral openings $h$. The spiral flange or flanges are intended to carry the potatoes up to the discharge-spout $k$, secured to the rear timber of the main frame. The spirally-arranged openings, and the open-work tapering portion are for the escape of the dirt elevated into the drum by the plow or scoop. In the rear of and attached to the scoop is a forked or tined agitator, $l$, upon a pivoted rod, $m$, connected to an arm or rod, $m'$, which is connected to the weight end of a lever, $o$, pivoted to one side of the main frame and engaging a series of pins, $n$, extending laterally from an annular ring, $p$, upon the supporting-wheel $b$. When the machine is moved forward, the pins oscillate the lever and operate the agitator, which separates the potatoes from the soil that has been carried up into the revolving drum. As the soil and potatoes are carried rearwardly by the spiral flange, the dirt or soil falls through the openings in the drum. When a belt is used to revolve the drum, the drive-wheel $b'$ is provided with a band-pulley, $q$, fixed to the spokes of the wheel $b'$. The belt is passed around this pulley, then around a pulley, $r$, on top of the main frame in rear of the drive-wheel, and also around a pulley, $r'$, under the main frame in rear of the drive-wheel, and around the rear end of the drum, as shown in the drawings. If gearing is to be used, the drive-wheel is provided with a gear-wheel and a shaft having a miter-gear connects this gear-wheel with teeth on the periphery of the drum at its rear end. The tongue is made in two sections, the main section $s$ being pivoted to the rear section, $s'$, by a mortise-and-tenon connection. The rear end of the main section $s$ is bifurcated to receive a guide-rod, $t$, in a triangular standard, $t'$, rising from the front timber of the main frame. The rear timber of the frame is also provided with a standard, $t^2$, carrying a pivoted pawl, $t^3$. A rod, $u$, having a hand-wheel, $u'$, and a ratchet-wheel, $u^2$, at its rear end, has its bearings in the apices of the standards, and a chain, $v$, connects the forward end of the rod with the rear end of the main section of the tongue, for the purpose of adjusting the machine by winding and unwinding the chain to raise or lower the rear end of the tongue, as may be necessary. An auxiliary or platform frame, $w$, is pivoted to the main frame by hangers and extends in rear of the main frame. The main frame is provided with two seats over the platform-frame for two operators, who receive and bag or box the potatoes as they are discharged. The platform-frame has a caster-wheel, which permits the platform-frame to ride and turn with the machine.

From the foregoing description, taken in connection with the accompanying drawings, the operation of the invention will be readily understood. The machine is drawn by two horses, which walk between the rows of potatoes, and the scoop carries the potatoes and dirt up into the perforated drum where the dirt is separated from the potatoes, and the latter delivered to the operators on the platform, where they are sacked or received in baskets or boxes, as may be desired.

Having thus fully described my invention, what I claim as new, and desire to secure by Letters Patent, is—

1. In a potato-digger, the revolving drum mounted in bearings in the end timbers of the main frame, having the tapering open-work portion $g$ at the forward end, the spirally-arranged opening in the remaining portion, and the internal spiral flange, $i$, extending throughout its length, and mechanism for revolving said drum, substantially as specified.

2. In a potato-digger, the combination, with the main frame, of the platform pivoted thereto in rear of the revolving open-work drum, and mounted upon a caster-wheel, and the seats arranged above the platform, substantially as and for the purposes specified.

In testimony whereof I affix my signature in presence of two witnesses.

JOB ESTES.

Witnesses:
 EZRA B. MOREHOUSE,
 JAMES NORR.